US012069395B2

(12) United States Patent
 Agrawal et al.

(10) Patent No.: US 12,069,395 B2
(45) Date of Patent: Aug. 20, 2024

(54) DYNAMIC PRESENTATION SURFACE AND PRESENTER IMAGING FOR A TRANSMITTING DEVICE IN A VIDEO COMMUNICATION SESSION

(71) Applicant: MOTOROLA MOBILITY LLC, Wilmington, DE (US)

(72) Inventors: Amit Kumar Agrawal, Bangalore (IN); Rahul B Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 255 days.

(21) Appl. No.: 17/502,341

(22) Filed: Oct. 15, 2021

(65) Prior Publication Data
US 2023/0120735 A1   Apr. 20, 2023

(51) Int. Cl.
| | |
|---|---|
| *H04N 5/262* | (2006.01) |
| *G06V 40/10* | (2022.01) |
| *G06V 40/16* | (2022.01) |
| *G09B 5/06* | (2006.01) |
| *G10L 15/22* | (2006.01) |
| *G10L 15/26* | (2006.01) |
| *G10L 25/57* | (2013.01) |
| *H04L 65/75* | (2022.01) |
| *H04N 5/265* | (2006.01) |
| *H04N 23/611* | (2023.01) |

(52) U.S. Cl.
CPC ......... *H04N 5/2628* (2013.01); *G06V 40/107* (2022.01); *G06V 40/166* (2022.01); *G10L 15/22* (2013.01); *G10L 15/26* (2013.01); *G10L 25/57* (2013.01); *H04L 65/762* (2022.05); *H04N 5/265* (2013.01); *H04N 23/611* (2023.01); *G09B 5/065* (2013.01)

(58) Field of Classification Search
CPC .... H04N 5/2628; H04N 23/611; H04N 5/265; G06V 40/166; G06V 40/107; H04L 65/762; G06L 15/22; G06L 15/26; G06L 25/57; G09B 5/065
USPC ...................................................... 348/14.07
See application file for complete search history.

(56) References Cited

U.S. PATENT DOCUMENTS

| 9,053,455 B2 * | 6/2015 | Barrus ..................... G09B 5/12 |
| 11,240,284 B1 * | 2/2022 | Gonzalez ................ H04L 65/75 |

(Continued)

*Primary Examiner* — Binh Kien Tieu
(74) *Attorney, Agent, or Firm* — Isidore PLLC

(57) ABSTRACT

An electronic device, computer program product, and method are provided that automatically focus on meaningful content in an image stream during an instruction-oriented video communication session. The electronic device communicatively connects the electronic device via a network to second electronic device(s) during a video communication session. A controller of the electronic device identifies a person and a writing surface within an image stream from a local image capturing device. In response to determining that the person is attending to the writing surface, the controller communicates to a video communication session a first portion of the image stream that focusses on the writing surface. In response to determining that the person is not attending to the writing surface, the controller communicates to the video communication session via the at least one network interface, a second portion of the image stream that does not focus on the writing surface.

20 Claims, 10 Drawing Sheets

(56) References Cited

U.S. PATENT DOCUMENTS

| | | | | |
|---|---|---|---|---|
| 11,348,264 | B1* | 5/2022 | Back | G06V 10/25 |
| 2013/0285909 | A1* | 10/2013 | Patel | G06F 3/017 |
| | | | | 345/158 |
| 2014/0063177 | A1* | 3/2014 | Tian | H04N 7/152 |
| | | | | 348/E7.083 |
| 2021/0118232 | A1* | 4/2021 | Scott, II | G06V 40/28 |
| 2022/0318551 | A1* | 10/2022 | St. Amant | G02B 27/0172 |
| 2022/0335620 | A1* | 10/2022 | Ostap | G06T 5/50 |
| 2023/0113359 | A1* | 4/2023 | Shen | H04N 23/695 |
| | | | | 345/633 |
| 2023/0164422 | A1* | 5/2023 | Slowack | H04N 21/2665 |
| | | | | 348/169 |
| 2023/0186654 | A1* | 6/2023 | Lu | G10L 25/78 |
| | | | | 382/176 |
| 2023/0214530 | A1* | 7/2023 | Jepperson | H04L 12/1827 |
| | | | | 726/26 |

* cited by examiner

DYNAMIC PRESENTATION SURFACE AND PRESENTER IMAGING FOR A TRANSMITTING DEVICE IN A VIDEO COMMUNICATION SESSION

BACKGROUND

1. Technical Field

The present disclosure relates generally to electronic devices that support and/or enable video communication sessions with second communication device(s), and more particularly to electronic devices that can dynamically edit an image stream produced by a local camera during a video communication session.

2. Description of the Related Art

Electronic devices such as mobile phones, network servers, desktop workstations, laptops, and tablets are often used to participate in or to enable online human communication. So as to simulate an in-person conversation, meeting, or lecture, each participant in a video communication session generally positions themself within the field of view of the local camera and within detection range of the microphone. The respective image and audio streams are communicated to the video communication session for presentation by one or more second electronic devices. Recent trends are for increased use of video communications in a wide range of settings including homes and public spaces.

Video communication sessions are increasing used for academic instruction and training. Teachers and lecturers often choose to write teaching points on a writing surface such as a chalk board, a large writing tablet erected on an easel, or erasable white board. Remote participants generally use personal user devices that have a small display such as a smartphone, tablet, or small laptop. The limited display capability can reduce the ability of the participant to clearly discern all of the portions of the collective visual content that is provided during the video communication session. An image stream encompassing the teacher and writing surface with content written thereon is presented in a full-image format, which makes it difficult to see the written content added to the writing surface.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
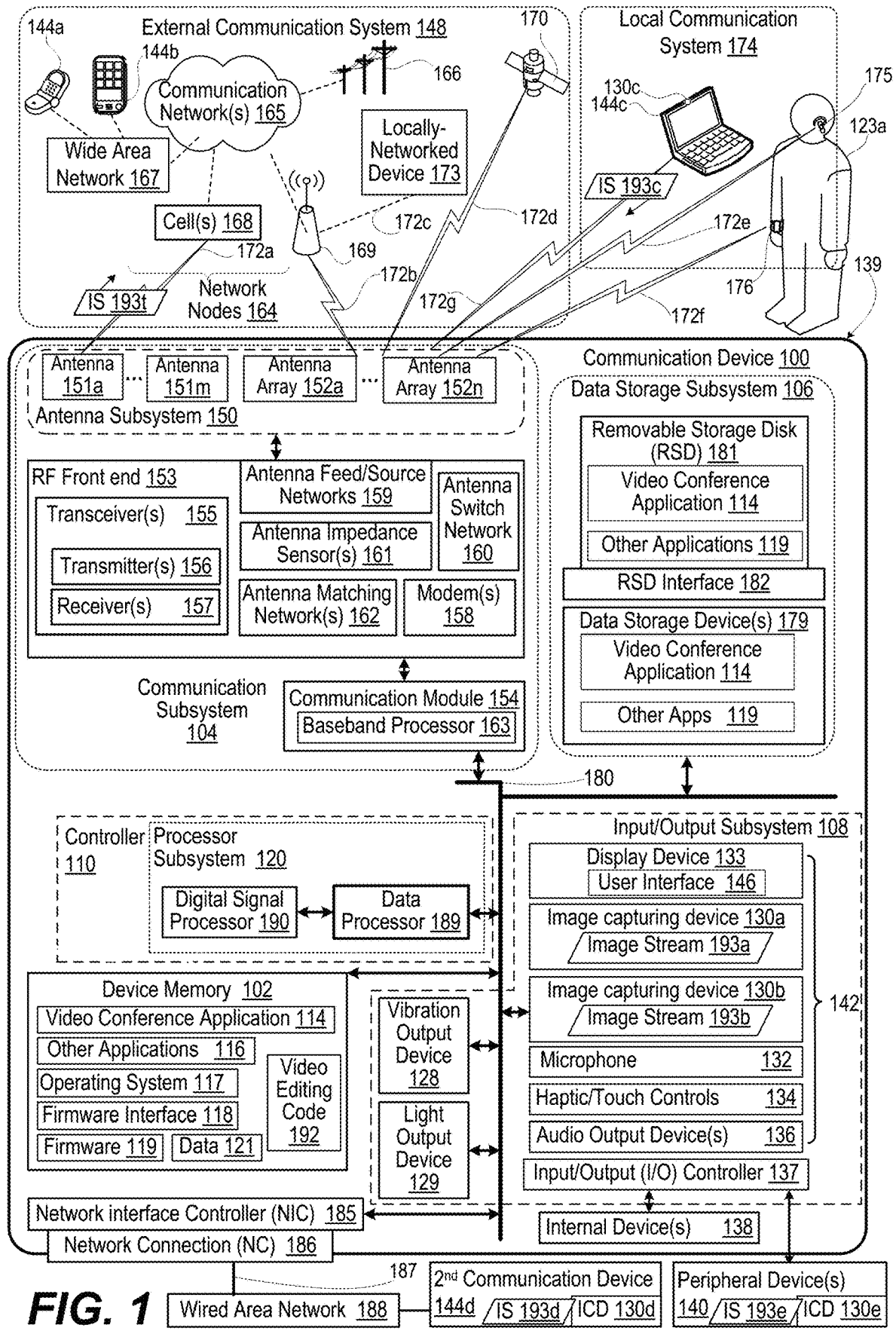
FIG. 1 depicts a functional block diagram of a communication environment including a communication device having components that automatically communicates a relevant or meaningful portion of an image stream to focus on visual instructional information, and within which the features of the present disclosure are advantageously implemented, according to one or more embodiments.

According to a first aspect of the present disclosure, an electronic device, a computer program product, and a method are provided that automatically focus on meaningful and relevant content in an image stream during a video communication session. The video communication session can be an online-communicated instruction-oriented session (e.g., a teaching or lecturing session). In one or more embodiments, the electronic device, acting as a transmitting device communicates only specific portions of captured content to receiving devices, so that receiving devices with a limited display size can present the meaningful content in a legible size. In one or more embodiments, the transmitting electronic device communicates all of the captured content to the receiving devices to allow the devices that have a larger display device to present all or select portions of the content. According to one aspect, the receiving devices with smaller displays are also configured to selectively present only specific (relevant) portions of the content when all of the content is received.

The transmitting electronic device includes at least one image capturing device that provides an image stream of captured content. The electronic device includes at least one network interface that communicatively connects the electronic device to at least one second electronic device during a video communication session. A controller that manages the electronic device is communicatively coupled to the at least one image capturing device and the at least one network interface. During a video communication session with the at least one second electronic device, the controller identifies a person and a writing surface within the image stream. In response to determining that the person is attending to the writing surface, the controller communicates, to the video communication session via the at least one network interface, a first portion of the image stream that focusses on the writing surface. In response to determining that the person is not attending to the writing surface, the controller communicates, to the video communication session via the at least one network interface, a second image stream that is one of the entire image stream or a second portion of the image stream that does not focus on the writing surface. In one embodiment, the second portion focusses on the person and specially, a face of the person when the person's face is visible.

According to a second aspect of the present disclosure, an electronic device, a computer program product, and a method are provided that automatically focus on meaningful and relevant content in an image stream during an instruction-oriented video communication session. The electronic device operates as a receiving device that receives the image stream from one or more transmitting devices. The receiving electronic device includes at least one display device. The receiving electronic device includes at least one network interface that communicatively connects the electronic device to at least one image stream transmitting (IST) electronic device during a video communication session. A controller of the receiving electronic device is communicatively coupled to the at least one display and the at least one network interface. The controller receives at least one image stream from the at least one IST electronic device. The controller identifies a person and a writing surface within the image stream. In response to determining that the person is attending to the writing surface, the controller presents, at the at least one display device, a first portion of the image stream that focusses on the writing surface. In response to determining that the person is not attending to the writing surface, the controller presents all of the image stream or a second portion of the image stream that does not focus on the writing surface but focussses on a face of the person when the person's face is visible.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, within an operating environment and within which several of the features of the present disclosure are advantageously implemented. Referring now to the specific component makeup and the associated functionality of communication device 100. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as video conference application 114, and other application(s) 116. Device memory 102 further includes operating system (OS) 117, firmware interface 118, such as basic input/output system (BIOS) or Uniform Extensible Firmware Interface (UEFI), and firmware 119.

Controller 110 includes processor subsystem 120 that executes program code to provide operating functionality of communication device 100 that automatically communicates a relevant portion of an image stream to focus on visual instructional information or other visual content. The software and/or firmware modules have varying functionality when their corresponding program code is executed by processor subsystem 120 or secondary processing devices within communication device 100. Processor subsystem 120 of controller 110 can execute program code of video conference application 114, and other application(s) 116 to configure communication device 100 to perform specific functions. Device memory 102 can include data 121 used by the applications.

I/O subsystem 108 includes user interface components such as vibration output device 128, light output device 129, image capturing devices 130a-130b, microphone 132, display device 133, touch/haptic controls 134, and audio output device(s) 136. In an example, image capturing devices 130a-130b are front and back cameras. In another example, image capturing devices 130a-130b are on the same side but have different lenses such as two different ones of telephoto, wide angle, macro, or general purpose lenses. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to image capturing devices 130a-130b and to at least one user interface device 142, such as at least one microphone 132. Image capturing device 130a and user interface device 142 allows a participant using communication device 100 to be an active participant in a video communication session with a second participant using a corresponding one of second communication device 144a-144d that can be similarly configured and/or provide similar functionality as communication device 100. Controller 110 is also communicatively coupled to at least one display device 133 that presents user interface 146 for the video communication session. Controller 110 executes video conference application 114 stored in device memory 102 to configure communication device 100 to enable communication with second communication device(s) 144a-144d in the video communication session. It is appreciated that second communication device 144a-144d can be identically or similarly equipped with components and functionality described for communication device 100. According to aspects of the present disclosure, communication device 100 can be communicatively coupled to one or more of image capturing devices ("ICC") 130c-130e respectively provided for example by communication devices 144c/144d and peripheral device 140.

Each of communication device 100 and second communication devices 144a-144d can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 148. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 using by antenna subsystem 150. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceiver(s) 155. Antenna matching network(s) 162 can also be used to detune the impedance of lower band antennas 151a-151m to not match the impedance of transceiver(s) 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks to communication device 100 and second communication devices 144a/144b. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas (151a-151m, 152a-152n) are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node(s) 169. Communication subsystem 104 receives downlink broadcast channel(s) 172d from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with wireless headset 175. Communication subsystem 104 communicates via second low power wireless communication channel(s) 172f, such as Bluetooth, with smart watch 176 such as used by local participant 123a. In one or more particular embodiments, communication subsystem 104 communicates with second communication device(s) 144c via wireless link 172g to form an ad hoc network.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as video conference application 114 and other application(s) 116 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for video conference application 114 and other application(s) 116.

In one or more embodiments, I/O subsystem 108 includes network interface controller (NIC or "network interface") 185 with a network connection (NC) 186 on housing 139. Network cable 187 connects NC 186 to wired area network 188. NIC 185 can be referred to as a "network interface" that can support one or more network communication protocols. Wired area network 188 can be a local area network (LAN), a campus area network (CAN), a metropolitan area network (MAN), or a wide area network (WAN). For example, NC 186 can be an Ethernet connection. Second communication devices 144d is communicatively coupled to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 120, which includes one or more central processing units (CPUs), depicted as data processor 189. Processor subsystem 120 can include one or more digital signal processors 190 that are integrated with data processor 189. Processor subsystem 120 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

In one or more embodiments, processor subsystem 120 executes video editing code 192, such as stored in device memory 102 to dynamically create an alternate or substitute image stream, such as a resized version of image stream 193a-193e received from corresponding image capturing device 130a-130e. In an example, video editing code 192 when executed by image capturing device 130a, data processor 189 or digital signal processors 190 may create a resized version of an entirety or a portion of image stream 193a-193e. A portion of image stream 193a-193e may be cropped, changing a range of included array of pixels to a reduced number. A portion or the entirety of image stream 193a-193e can be stretched or compressed in one or two dimensions. The amount of stretching or compression can be different in the vertical and horizontal axes. In one or more embodiments, cropping and resizing is driven by one of the two dimensions that constrains presentation while maintaining an aspect ratio of the cropped portion.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

According to one aspect, communication device 100 can function as a content-discerning "transmitting device" that selectively identifies a meaningful and relevant portion of one of image streams 193a-193d to communicate to one or more second communication devices 144a-144b that function as "receiving device(s)" for remote participants. The multiple image streams 193a-193d can originate from different image capturing devices. In an example, image capturing devices 130a-130b of communication device 100 can provide multiple image streams 193a-193b, respectively. In another example, at least one of second electronic devices 144c-144d is available locally to communication device 100 to provide a respective image streams 193c-193d from respective image capturing devices 130c-130d to controller 110. In an additional example, peripheral device 140 has image capturing device 130e that provides image stream 193e to controller 110. Controller 110 configures communication device 100 and the communicatively connected one or more second electronic devices 144c-144e and peripheral device 140 to perform functionality described herein for focussing on a meaningful and relevant portion of visual instructional content in one or more selected image stream 193a-193e. According to one embodiment, controller 110 executes video conference application 114, stored in a computer readable medium such as device memory 102, to automatically select the meaningful and relevant portion of one of locally available image streams 193c-193d among more than one image streams 193c-193d to communicate to a video communication session.

According to another aspect, communication device 100 can function as a content-discerning "receiving device", selecting identifying for local participant 123a a meaningful and relevant portion of received image stream communicated by one of one or more second communication devices 144a-144b that function as "transmitting device(s)". Controller 110 configures communication device 100 and the communicatively connected one or more second electronic devices 144c-144e to perform functionality described herein for focusing on a portion of received image stream. In an example, controller 110 executes video conference application 114, stored in a computer readable medium such as device memory 102, to automatically select the meaningful and relevant portion of one of transmitted image streams 193t (FIG. 4) to present on display device 133.

Figure 2:
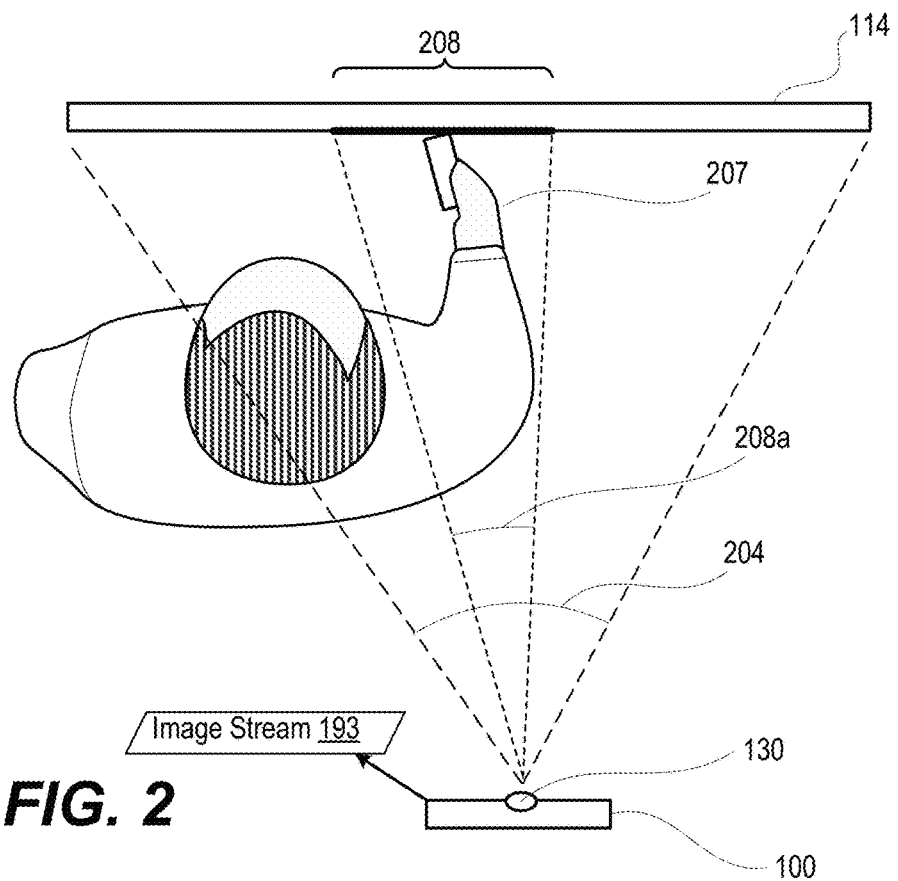
FIG. 2 depicts a top view of the communication device capturing an image stream of a local participant attending to a writing surface, according to one or more embodiments.

FIG. 2 depicts a top view of communication device 100 with image capturing device 130 that is configured and positioned to produce image stream 193 of FOV 204. FOV 204 captures local participant 123a who is attending to writing surface 206. Controller 110 (FIG. 1) may determine that local participant 123a is attending to writing surface 206 by identifying, from received image stream, one or more of: (i) local participant 123a is facing writing surface 126; (ii) local participant 123a is not facing communication device 100a or image capturing device 130; (iii) hand 207 of local participant 123a is proximate to writing surface 206; (iv) new written content 208 is appearing on writing surface 206; and (v) local participant 123a is not speaking. In response, controller 110 (FIG. 1) extracts, crops, zooms, or otherwise focusses on first portion 208a of FOV 204 to emphasize written content 208 for legibility.

Figure 3:
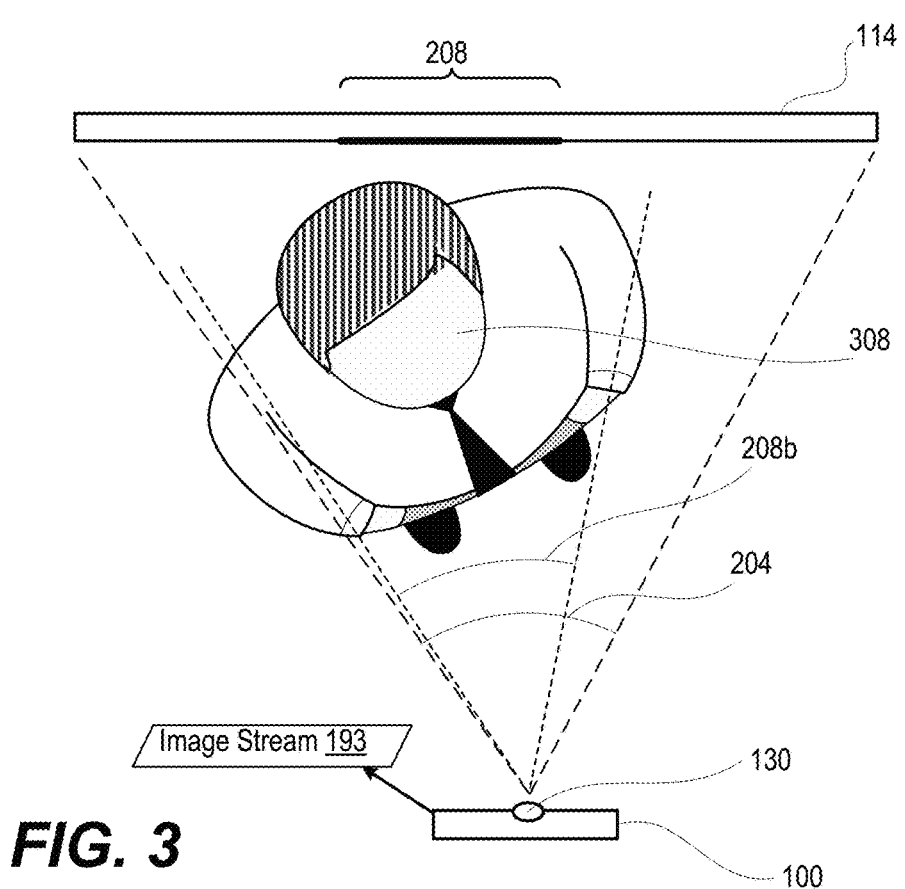
FIG. 3 depicts a top view of the communication device capturing an image stream of the local participant while not attending to the writing surface, according to one or more embodiments.

FIG. 3 depicts a top view of communication device 100 with image capturing device 130 capturing an image stream of local participant 123a who is not attending to writing surface 206. Controller 110 (FIG. 1) can determine that local participant 123a is not attending to writing surface 206 by identifying, from received image stream, one or more of: (i) local participant 123a is not facing writing surface 126; (ii) local participant 123a is facing communication device 100 or image capturing device 130; (iii) hand 207 of local participant 123a is not proximate to writing surface 206; (iv) new written content 208 is not appearing on writing surface 206; and (v) local participant 123a is speaking. In response, controller 110 (FIG. 1) extracts, crops, zooms, or otherwise focusses on at least face 308 of local participant 123a of second portion 208b of FOV 204. Second portion 208b can include an entirety of image stream 193 produced by image capturing device 130.

Figure 4:
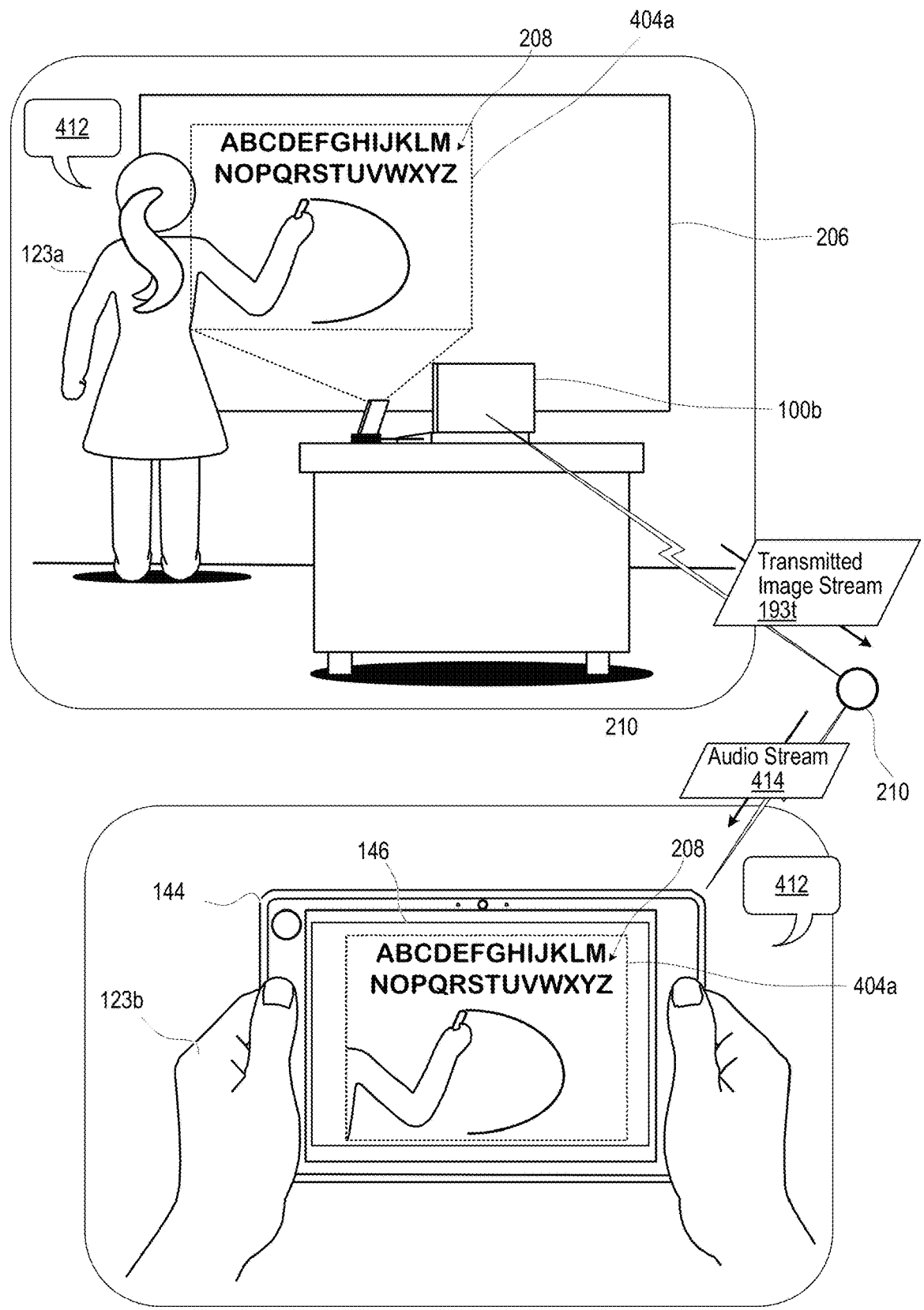
FIG. 4 depicts a front view of the communication environment including the transmitting communication device of FIG. 2 communicating a focused portion of the writing surface to a receiving communication device, according to one or more embodiments.

FIG. 4 depicts a front view of communication environment 400 including (transmitting) communication device 100a that communicates transmitted image stream 193t to (receiving) communication device 144. In one or more embodiments, local participant 123a is also using second communication device 100b. In one embodiment, second communication device 100b also includes a second image capturing device that can selectively capture an image stream based on the FOV of the second image capturing device. Controller 110 (FIG. 1) determines that local participant 123a is attending to writing surface 126. In response, controller 110 (FIG. 1) focusses on first portion 404a of FOV 204 of image capturing device 130 in producing and communicating transmitted image stream 193t. For clarity, communication device 100a communicates transmitted image stream 193t via network 210 to the video communication session, which includes at least second communication device 144. Display device 133 of communication device 144 presents user interface 146, to remote participant 123b, depicting first portion 404b that incorporates writing surface 206, and specifically written content 208. Communication device 100a captures speech 412 produced by local participant 123a and transmits the captured speech as first audio stream 414 to the video communication session.

Figure 5:
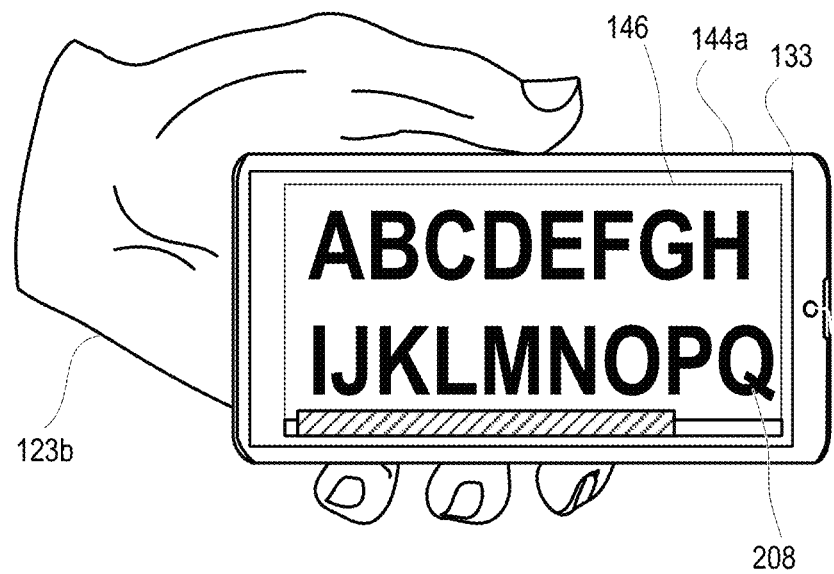
FIG. 5 depicts a front view of a receiving communication device having a small display device that is presenting scrollable portion of written content sized for legibility, according to one or more embodiments.

FIG. 5 depicts a front view of (receiving) communication device 144 participating in a video communication session and receiving an image stream with written content from the video communication session. Communication device 144 has display device 133, which is relatively small. Because of the size of display device 133, controller of receiving communication device 144 configures display device 133 to present user interface 146 that includes a scrollable portion of written content 208, sized for legibility. Controller of communication device 144 can parse, crop, reconfigure, resize and perform other operations on, to, or with the received image stream in order to legibly present written content 208 on display device 133.

Figure 6:
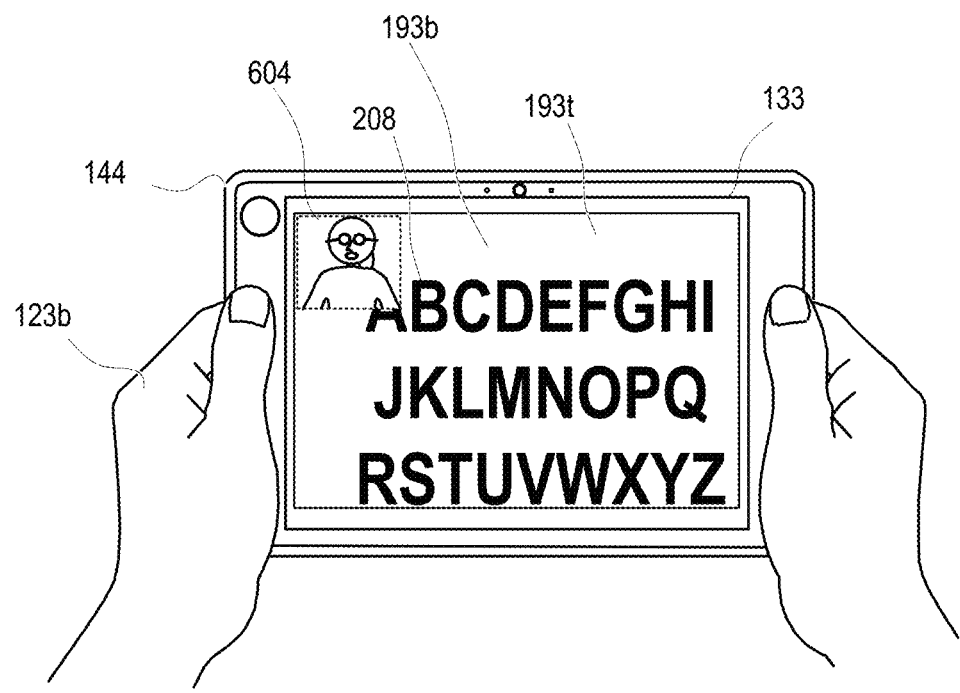
FIG. 6 depicts a front view of a receiving communication device having a moderately sized display device presenting an entirety of the written content along with a picture-in-picture of a presenter/teacher, according to one or more embodiments.

FIG. 6 depicts a front view of (receiving) communication device 144 participating in a video communication session and receiving an image stream with written and other content from the video communication session. Communication device 144 has display device 133 of moderate size. Because of the size of display device 133, controller of receiving communication device 144 configures display device 133 to present an entirety of written content 208 along with picture-in-picture (PIP) window 604 of second portion of received image stream incorporating local participant 123a of transmitting communication device.

Figure 7:
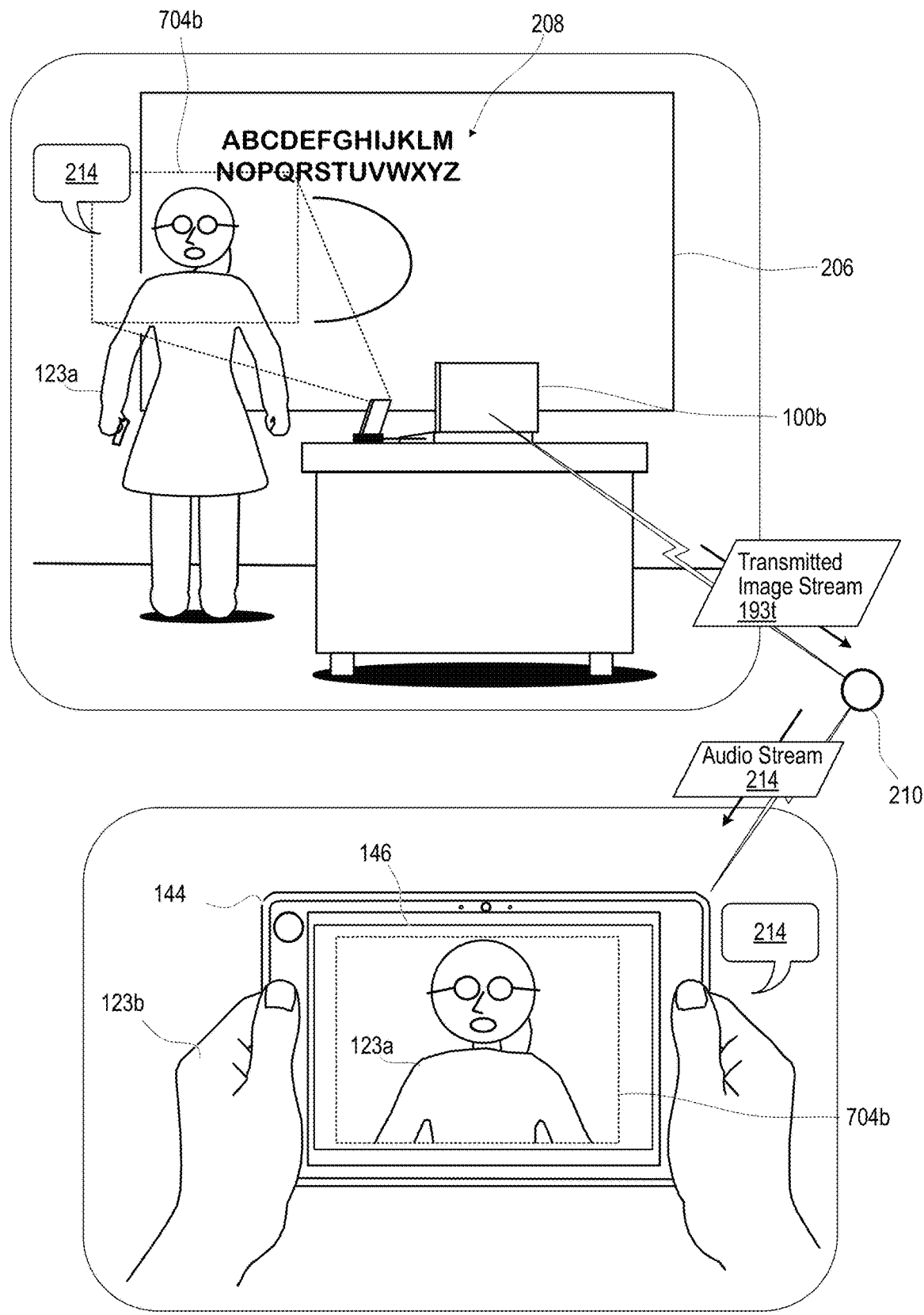
FIG. 7 depicts a front view of the communication environment including the transmitting communication device communicating a focused portion of the teacher to the receiving communication device, according to one or more embodiments.

FIG. 7 depicts a front view of communication environment 400 including (transmitting) communication device 100a, which communicates transmitted image stream 193t to (receiving) communication device 144. In one or more embodiments, local participant 123a is also using second communication device 100b. Controller 110 (FIG. 1) determines that local participant 123a is not attending to writing surface 126. In response, controller 110 (FIG. 1) focusses on second portion 704a of FOV 204 of image capturing device 130 in producing and communicating transmitted image stream 193t. For clarity, communication device 100a communicates transmitted image stream 193t via network 210 to the video communication session that includes at least second communication device 144. Display device 133 of receiving communication device 144 presents user interface 146 including second portion 704b to remote participant 123b, depicting second portion 208b that does not focus on written content and/or which incorporates local participant 123a. Communication device 100a captures speech 212 produced by local participant 123a and transmits the captured speech as first audio stream 214 to the video communication session.

Figure 8:
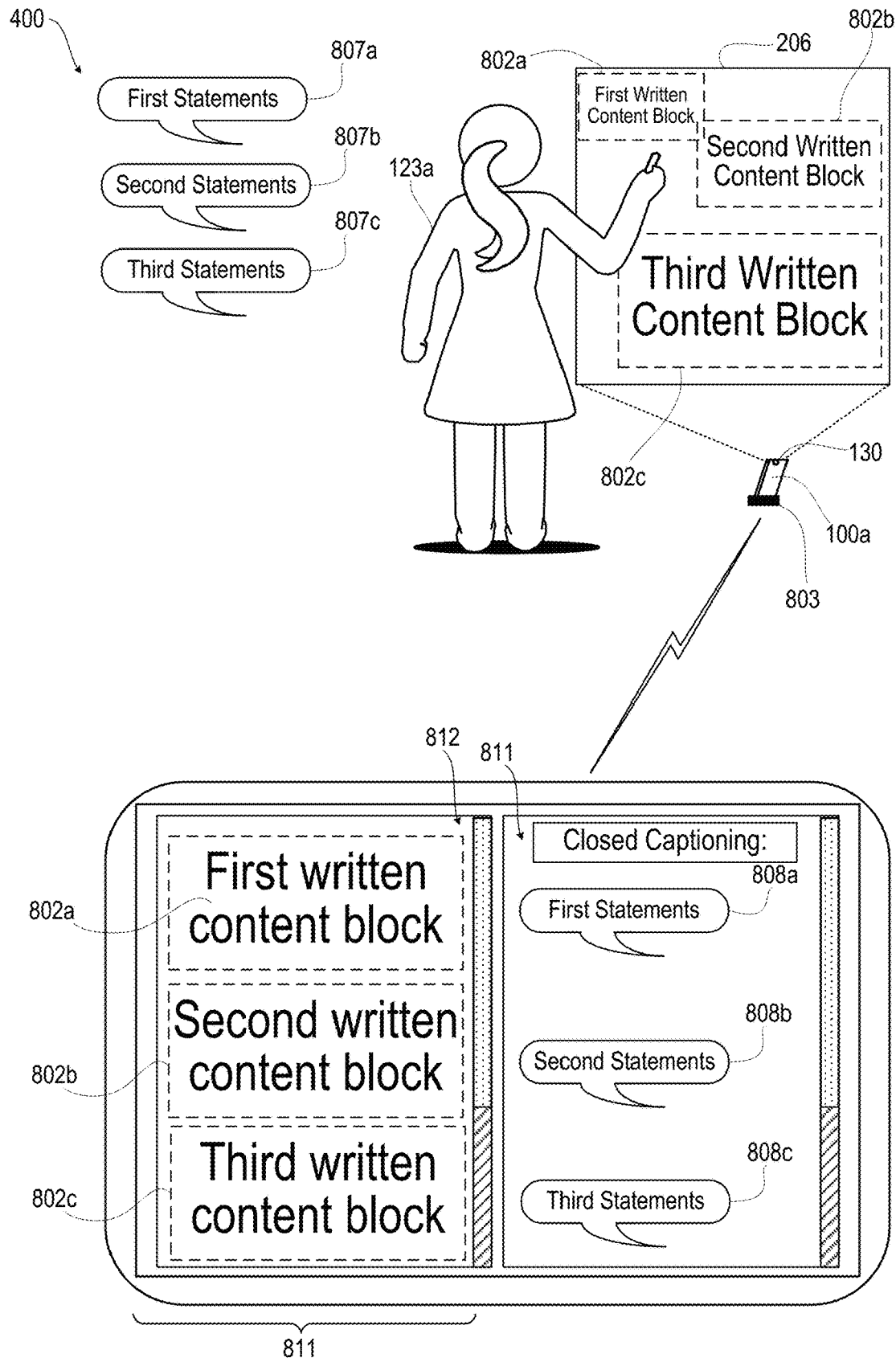
FIG. 8 depicts a front view of the example communication environment that captures and resizes written content with corresponding closed captioning of captured audio accompanying the written content, according to one or more embodiments.

FIG. 8 depicts a front view of example communication environment 400 (FIG. 4) with communication device 100a, which captures and presents resized written content and captures speech and presents the speech as closed captioning. Communication device 100a has image capturing device 130a positioned by dock 803 to have an FOV the incorporates at least writing surface 206. Communication device 100b is positioned to have local participant 123a incorporated within the FOV of image capturing device 130. Local participant 123a sequentially creates first, second, and third written content blocks 802a-802c (collectively 802) on writing surface. Local participant 123a can create first written content block 802a of a small size. Local participant speaks audio output segments 807a-807c in conjunction with creating first written content block 802a. Controller 110 (FIG. 1) captures first audio output segment 807a as first closed captioning segment 808a. Local participant 123a creates second written content block 802b that is of a medium size, i.e., larger than the small size of the first written content block 802a. Local recipient speaks second audio output segment 807b in conjunction with creating second written content block 802b. Controller 110 (FIG. 1) captures second audio output segment 807b as second closed captioning segment 808b. Then local participant 123a creates third written content block 802c of another size that is different from the sizes of the first two content blocks, e.g., a large size. Local recipient speaks third audio output segment 807c in conjunction with creating third written content block 802c. Controller 110 (FIG. 1) captures third audio output segment 807c as third closed captioning segment 808c. For clarity, written content blocks 802a-802c are depicted as being all viewable on writing surface 206 at the same time. In one embodiment, local participant 123a can erase writing surface 206 or replace a writing substrate of writing surface 206 and add new written content on the newly blank area of writing surface 206. For clarity, three written content blocks 802a-802c are depicted with three corresponding closed captioning segment 808a-808c. In other embodiments, various sizes and combinations of written content blocks and different instances of audio output segments can occur. In an example, the teacher may not speak when writing particular written content blocks or closed captioning may not be captured. In one or more embodiments, the written content blocks can be converted to text using optical character recognition to provide a uniform typeface and size. The presentation of written content in sequential format can be presented separate from any closed captioning. In another example, closed captioning can be captured and presented as a standalone presentation item activated by a remote participant. In an additional example, closed captioning can be activated by remote participants who have hearing difficulties and prefers close caption for live presentations in lieu of, or in addition to, audio presentation.

To assist remote participants 123b (FIG. 2) with following or receiving the sequence of written content blocks in a cohesive manner, controller 110 (FIG. 1) resizes and places written content blocks 802a-802c in sequential order as uniform written content 811. Closed captioning segments 808a-808c are aligned or interleaved with the corresponding written content blocks 802a-802c in uniform written content 811 to create transcript 812.

Figure 9A:
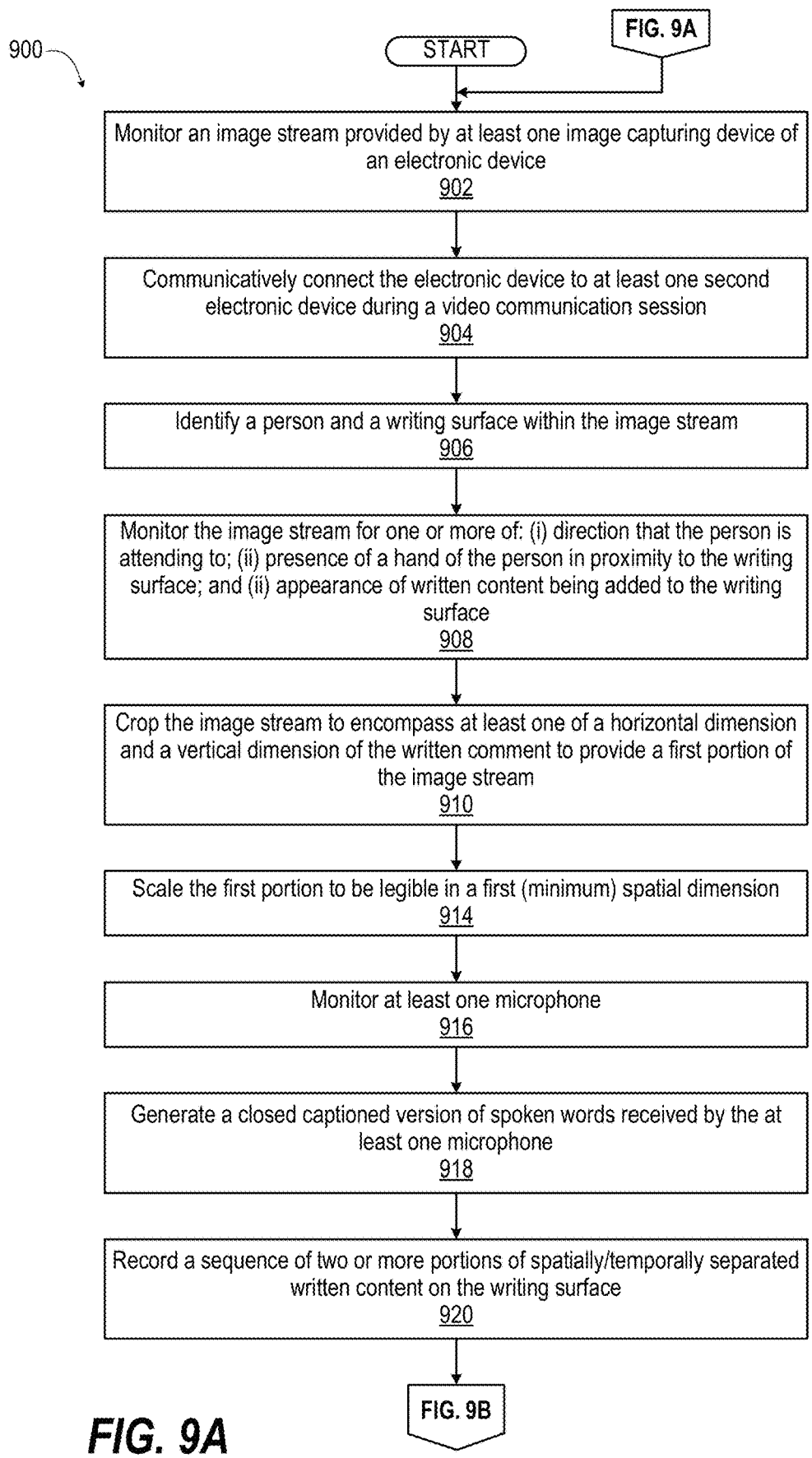
FIGS. 9A-9B (FIG. 9) depict a flow diagram of a method for automatically focussing on relevant content in a local image stream that is communicated to a receiving communication device, according to one or more embodiments.
Figure 9B:
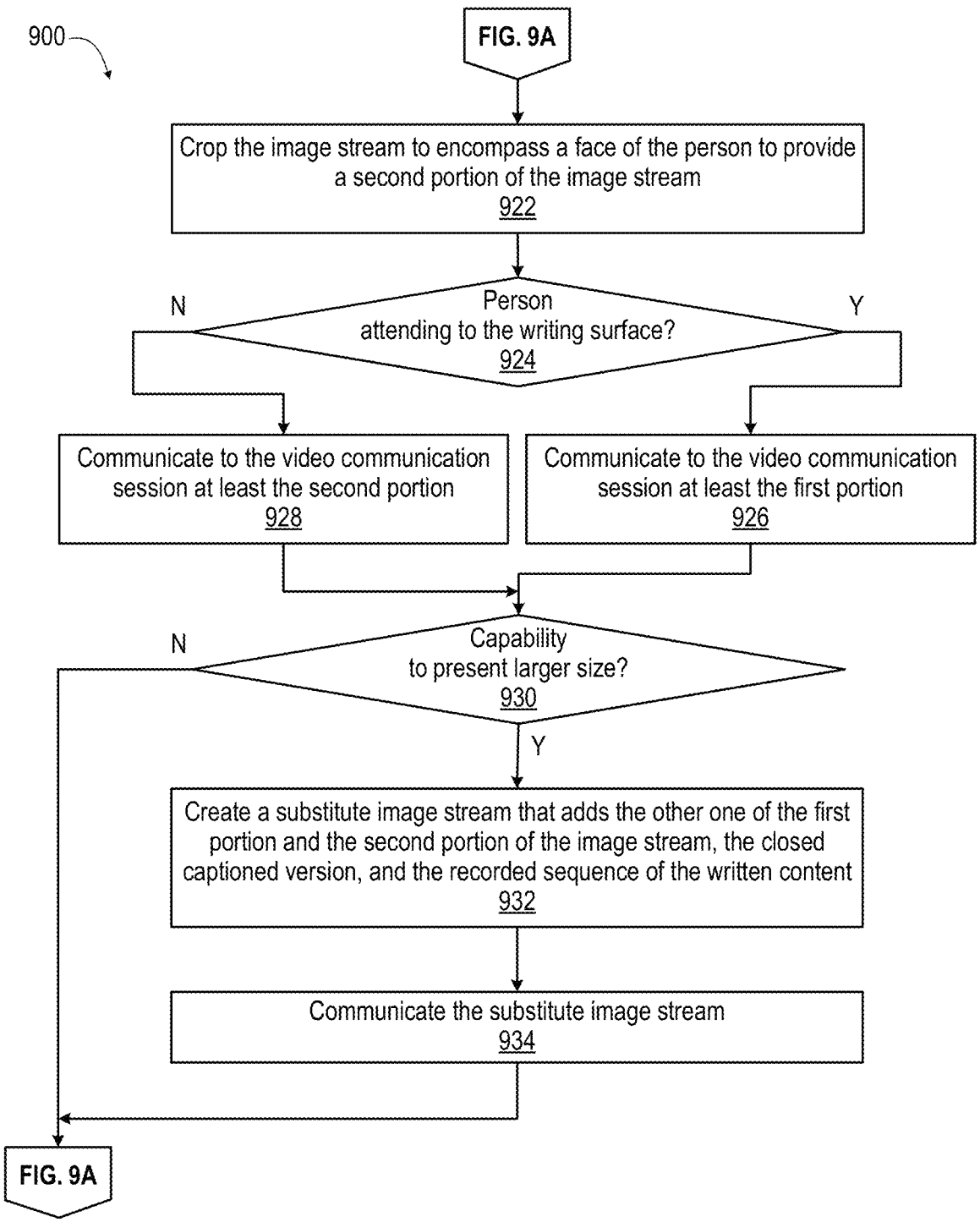

With reference now to the flow charts, there are presented method 900 and method 1000, respectively illustrated by FIGS. 9 and 10. Method 900 describes examples of functionality performed by communication device 100 (FIG. 1) when acting as a "transmitting device". Method 1000 describes examples of functionality performed by communication device 100 (FIG. 1) when acting as a "receiving device" to improve legibility of a received image stream. FIGS. 9A-9B (FIG. 9) depict a flow diagram of a method for automatically focussing on relevant content in a local image stream that is communicated to a receiving communication device. In at least one embodiment, communication device 100, managed by controller 110, executes video conference application 114, configuring communication device 100 (FIG. 1) to facilitate a video communication session. The descriptions of method 900, as well as method 1000 depicted in FIG. 10, are provided with general reference to the specific components illustrated within the preceding FIGS. 1-8, and specific components referenced in methods 900 and 1000 may be identical or similar to components of the same name used in describing preceding FIGS. 1-8.

With reference to FIG. 9A, method 900 includes monitoring an image stream provided by at least one image capturing device of an electronic device (block 902). Method 900 includes communicatively connecting the electronic device, via a network using at least one network interface, to at least one second electronic device during a video communication session (block 904). During the video communication session with at least one second electronic devices, method 900 includes identifying a person and a writing surface within the image stream (block 906). Method 900 includes monitoring the image stream for an indication that content is being written on the writing surface, the indication being one or more of: (i) the person is facing the direction of the writing surface; (ii) presence of a hand of the person in proximity to the writing surface; and (ii) appearance of written content being added to the writing surface (block 908). One or more of these detected images indicate that the person is facing, addressing, and/or attending to the writing surface. Method 900 includes cropping the image stream to encompass at least one of horizontal dimension and a vertical dimension of the written content to provide a first portion of the image stream (block 910). Method 900 includes scaling the first portion to be legible in a first (minimum) spatial dimension (block 914). Method 900 includes monitoring at least one microphone for speech input (block 916). Method 900 includes generating a closed-captioned version of spoken words received by the at least one microphone (block 918) while or after the written content is placed on the writing surface. Method 900 includes identifying that a next portion of written content is being presented and recording a sequence of two or more portions of written content on the writing surface, each portion at least one of spatially separated or temporally separated from another portion (block 920). In one or more embodiments, the recorded sequence can be linked to or interspersed with the closed-captioned version of spoken words. Method 900 continues with reference to FIG. 9B.

In FIG. 9B, method 900 includes cropping the image stream to encompass a face of the person to provide a second portion of the image stream (block 922). Method 900 includes monitoring the image stream and determining whether the person is attending to the writing surface (decision block 924). Based on determining that the person is attending to the writing surface, method 900 includes communicating to the video communication session, via the at least one network interface and network, at least the first portion of the image stream that focusses on the writing surface (block 926). Then method 900 proceeds to decision block 930.

In response to determining that the person is not attending to the writing surface, method 900 includes communicating to the video communication session, via the at least one network interface and network, at least the second portion of the image stream that does not focus on the writing surface, e.g., a portion that focusses on the face of the person (block 928). After method 900 performs one of blocks 926 and 928, method includes determining whether a particular second device indicates a capability to present in a second display size that is larger than the first size (decision block 930). In response to determining that the particular second display device does not indicate the second display size capability, method 900 returns to block 902 (FIG. 9A). In response to determining that the particular second display device indicates the second display size, method 900 includes creating a substitute image stream that adds the other one of the first portion and the second portion of the image stream, the closed-captioned content, and the recorded sequence of the written content (block 932). Method 900 includes communicating the substitute image stream to the video communication session for displaying on the receiving communication device (block 934). Then method 900 returns to block 902 (FIG. 9A).

Figure 10A:
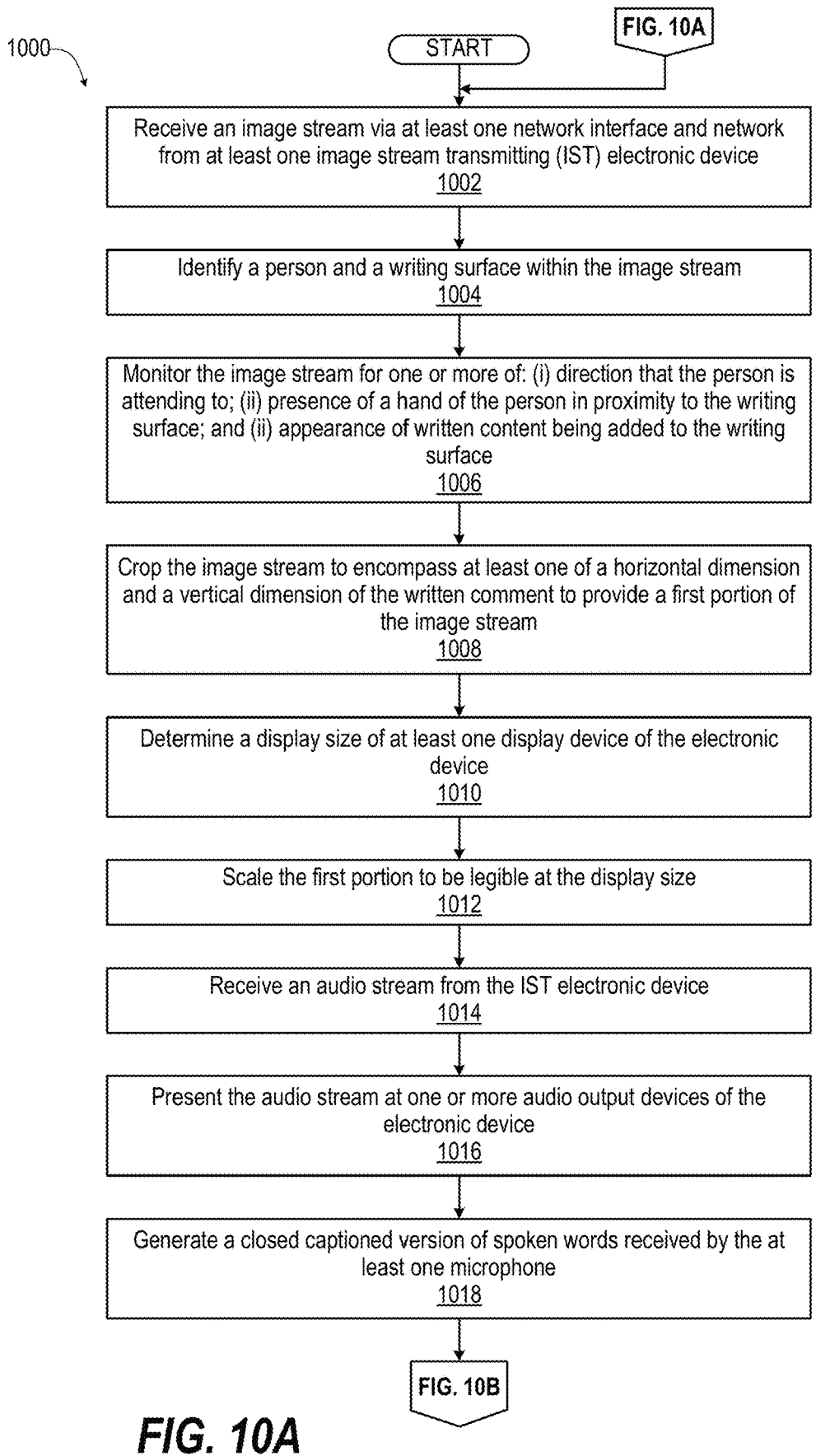
FIGS. 10A-10B (FIG. 10) depict a flow diagram of a method for automatically focussing and presenting on relevant content in a received image stream, according to one or more embodiments.
Figure 10B:
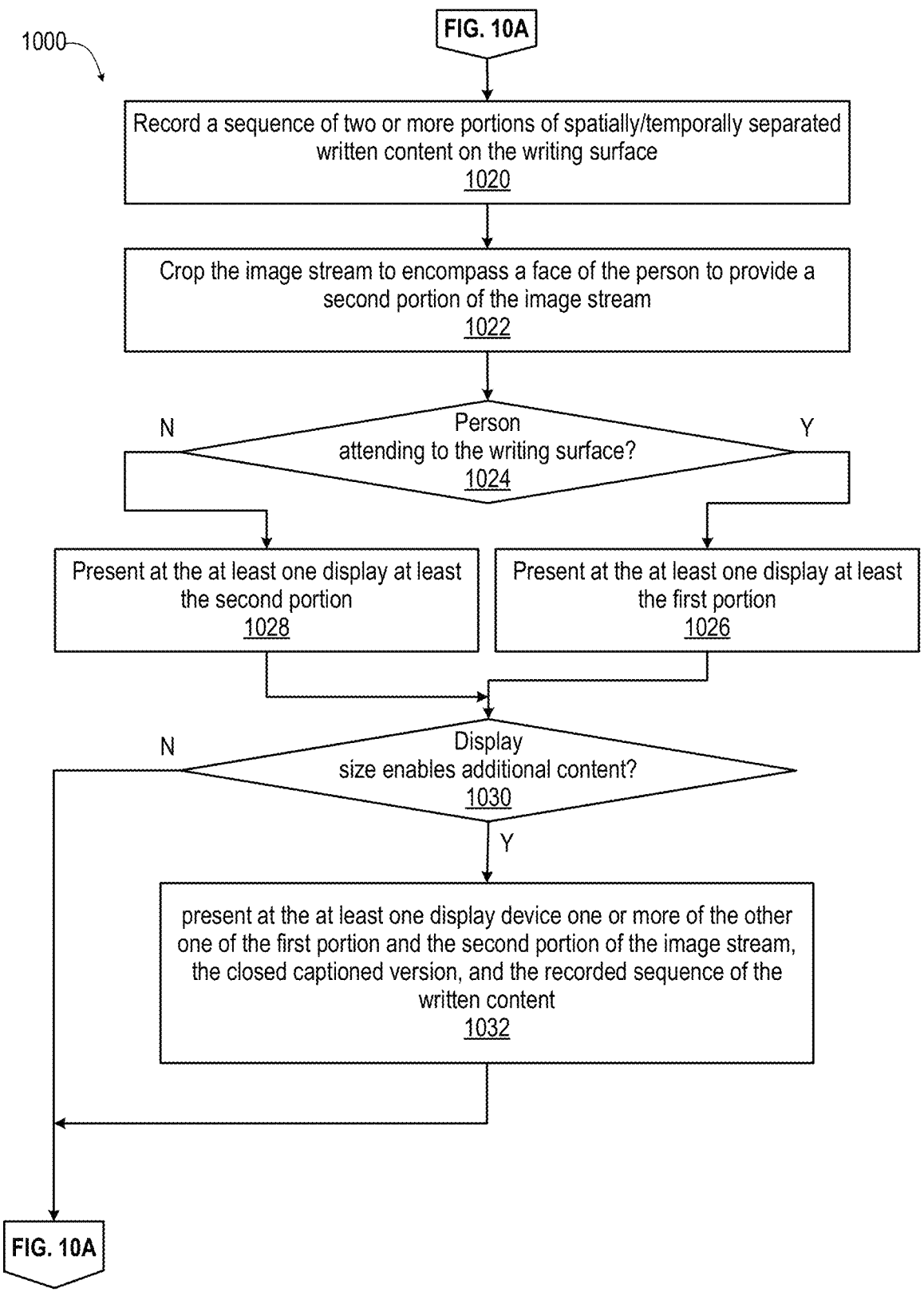

FIGS. 10A-10B (FIG. 10) depict a flow diagram of a method for automatically focussing and presenting on relevant content in a received image stream on a receiving communication device, according to one or more embodiments. With reference to FIG. 10A, method 1000 includes receiving, via at least one network interface and a network, at least one image stream from at least one image stream transmitting (IST) electronic device during a video communication session (block 1002). Method 1000 includes identifying a person and a writing surface within the image stream (block 1004). Method 1000 includes monitoring the image stream for one or more of: (i) direction that the person is facing; (ii) presence of a hand of the person in proximity to the writing surface; and (ii) appearance of written content being added to the writing surface (block 1006). One or more of these detected images indicate that the person is facing, addressing, and/or adding to the written content on the writing surface. Method 1000 includes cropping the image stream to encompass at least one of a horizontal dimension and a vertical dimension of the written content to provide a first portion of the image stream (block 1008). Method includes determining a display size of at least one display device of the electronic device (block 1010). Method 1000 includes scaling the first portion to be legible at the display size (block 1012). In one embodiment, method 1000 includes receiving an audio stream from the IST electronic device (block 1014). Method 1000 includes presenting the audio stream at one or more audio output devices of the electronic device (block 1016). Method 1000 includes generating a closed-captioned version of spoken words contained in the audio stream (block 1018). Method 1000 continues with reference to FIG. 10B.

In FIG. 10B, method 1000 includes recording a sequence of two or more portions of written content on the writing surface, each portion at least one of spatially separated or temporally separated from another portion (block 1020). In one or more embodiments, the recorded sequence can be linked to or interspersed with the closed-captioned version of spoken words. Method 1000 includes cropping the image stream to encompass a face of the person to provide a second portion of the image stream (block 1022). Method 1000 includes determining whether the person is attending to the writing surface in response to monitoring the image stream (decision block 1024). In response to determining that the person is attending to the writing surface, method 1000 includes presenting on the at least one display device at least the first portion of the image stream that focusses on the writing surface (block 1026). Then method 1000 proceeds to decision block 1030. In response to determining that the person is not attending to the writing surface, method 1000 includes presenting, on the at least one display device, at least the second portion of the image stream that focusses on the face of the person (block 1028). After method 1000 performs one of block 1026 and 1028, method 1000 includes determining whether the display size enables presenting additional content (decision block 1030). In response to determining that the display size does not enable presenting additional content, method 1000 returns to block 1002 (FIG. 10A). In response to determining that the display size enables presenting additional content, method 1000 includes presenting, at the at least one display device, one or more of the other one of the first portion and the second portion of the image stream, the closed-captioned version, and the recorded sequence of the written content (block 1032). In one embodiment, method includes presenting the portion with the face of the presented via a picture-in-picture window. Then method 1000 returns to block 1002 (FIG. 10A).

In one or more embodiments, method 1000 includes monitoring an image stream provided by at least one image capturing device of an electronic device. Method 1000 includes communicatively connecting the electronic device via a network using at least one network interface to at least one second electronic device during a video communication session. During the video communication session with at least one second electronic devices, method 1000 identifies a person and a writing surface within the image stream. In response to determining that the person is attending to the writing surface, method 1000 includes communicating to the video communication session via the at least one network interface, a first portion of the image stream that focusses on the writing surface. In response to determining that the person is not attending to the writing surface, method 1000 includes communicating to the video communication session via the at least one network interface, a second portion of the image stream that does not focus on the writing surface.

In one or more embodiments, method 1000 further includes communicating the second portion by: (i) identifying that the person is facing the image capturing device; and (ii) focussing on and capturing a face of the person as the second portion. In one or more embodiments, method 1000 further includes communicating the first portion of the image stream that focusses on the writing surface by: (i) identifying at least one of (i) a hand of the person in proximity to the writing surface; (ii) the person is gazing toward the writing surface; and (iii) written content being added to the writing surface; and (ii) cropping the portion of the image stream communicated to the video communication session to encompass the first portion focused on the writing surface. Method 1000 includes In one or more embodiments, method 1000 further includes determining a spatial dimension of the written content in the image stream. Method 1000 includes determining a first scaling factor of the spatial dimension that enables the written content to be legible when presented in a first display size by a first receiving device of the at least one second electronic device. Method 1000 includes sizing the first portion of the image stream using the scaling factor. In one or more particular embodiments, method 1000 further includes determining a second scaling factor of the spatial dimension that enables the written content to be legible when presented in a second display size, which is larger than the first display size, by a second receiving device of the at least one second electronic device. Method 1000 includes sizing the first portion of the image stream using the second scaling factor. In one or more particular embodiments, a second display size of the second receiving device supports simultaneous output of the first portion and the second portion of the image stream. Method 1000 further includes: (i) combining the first portion and the second portion of the image stream into a substitute image stream; and (ii) selectively communicating the substitute image stream to the second receiving device of the at least one second electronic devices. In one or more specific embodiments, method 1000 further includes recording a sequence of two or more portions of written content on the writing surface. Each portion are at least one of spatially separated or temporally separated from another portion. Method 1000 includes communicating the recorded sequence of the two or more writings within a scrolling window presented to the at least one second electronic devices.

In one or more embodiments, method 1000 further includes receiving, from at least one microphone of the electronic device, audio input comprising spoken words detected contemporaneously with a creation or presentation of associated written content. Method 1000 includes generating a closed-captioned version of the spoken words received by the at least one microphone. Method 1000 includes communicating the closed-captioned version of the spoken words to the at least one second electronic device for outputting contemporaneously with the associated written content. In one or more embodiments, in response to determining that the person is attending to the writing surface, method 1000 further includes: (i) determining at least one of a horizontal dimension and a vertical dimension of the writing; and (ii) cropping the image stream to the at least one of the horizontal dimension and the vertical dimension to provide the first portion.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one image capturing device that provides an image stream;
   at least one network interface that communicatively connects the electronic device to at least one second electronic device during a video communication session; and
   a controller communicatively coupled to the at least one image capturing devices and the at least one network interface, and which:
      during a video communication session with the at least one second electronic device, identifies a person and a writing surface within the image stream;
      in response to determining that the person is attending to the writing surface, selectively communicates, to the video communication session via the at least one network interface, a first portion of the image stream that focusses on the writing surface, wherein the controller:
         determines a spatial dimension of written content on the writing surface in the image stream;
         determines a first display size of a first receiving device of the at least one second electronic device;
         determines a first scaling factor of the spatial dimension that enables the written content to be legible when presented in the first display size by the first receiving device; and
         sizes the first portion of the image stream using the first scaling factor.

2. The electronic device of claim 1, wherein the controller:
   in response to determining that the person is not attending to the writing surface, communicates, to the video communication session via the at least one network interface, a second portion of the image stream that does not focus on the writing surface, wherein the controller identifies that the person is facing the image capturing device and focusses on and captures a face of the person as the second portion.

3. The electronic device of claim 2, wherein a second display size of a second receiving device supports simultaneous output of the first portion and the second portion of the image stream, and the controller:
   combines the first portion and the second portion of the image stream into a substitute image stream; and
   selectively communicates the substitute image stream to the second receiving device.

4. The electronic device of claim 1, wherein in communicating the first portion of the image stream that focusses on the writing surface, the controller:
   identifies at least one of (i) a hand of the person in proximity to the writing surface; (ii) the person is gazing toward the writing surface; and (iii) written content being added to the writing surface; and
   crops the captured image stream to encompass the first portion focused on the writing surface, which is communicated to the video communication session.

5. The electronic device of claim 1, wherein the controller:
   determines a second scaling factor of the spatial dimension that enables the written content to be legible when presented in a second display size, which is larger than the first display size, by a second receiving device of the at least one second electronic device;
   sizes the first portion of the image stream using the second scaling factor; and
   communicates, to the second receiving device, the first portion sized using the second scaling factor.

6. The electronic device of claim 1, wherein the controller:
   records a sequence of two or more portions of written content on the writing surface, each portion at least one of spatially separated or temporally separated from another portion; and
   communicates the recorded sequence of the two or more portions of written content to the at least one second electronic device for concurrent presentation as adjacent portions on a display of the at least one second electronic device.

7. The electronic device of claim 1, further comprising at least one microphone that is communicatively coupled to the controller, and the controller:
   receives, from the at least one microphone, audio input comprising spoken words detected contemporaneously with a creation or presentation of associated written content on the writing surface;
   generates a closed-captioned version of the spoken words; and
   communicates the closed-captioned version of the spoken words to the at least one second electronic device for outputting contemporaneously with the associated written content.

8. The electronic device of claim 7, wherein the controller, to communicate the closed-caption version of the spoken words:
   links each of at least two portions of written content with corresponding closed-captioned versions of spoken words captured by the at least one microphone contemporaneously with a generation of a respective portion of written content; and
   communicates both the close-captioned versions of the spoken words and the respective portion of written content for concurrent presentation with the closed-captioned version of spoken words aligned or interleaved with its corresponding written content within the second display of the at least one second electronic device, to present a transcript.

9. The electronic device of claim 1, wherein the controller:
   in response to determining that the person is attending to the writing surface:
      determines at least one of a horizontal dimension and a vertical dimension of written content on the writing surface; and
      crops the image stream to the at least one of the horizontal dimension and the vertical dimension to provide the first portion.

10. A method comprising:
   monitoring an image stream provided by at least one image capturing device of an electronic device;
   communicatively connecting the electronic device via a network using at least one network interface to at least one second electronic device during a video communication session;
   during the video communication session with at least one second electronic devices, identifying a person and a writing surface within the image stream;
   in response to determining that the person is attending to the writing surface, selectively communicating to the video communication session via the at least one network interface, a first portion of the image stream that focusses on the writing surface, the selectively communicating comprising:
  determining a spatial dimension of written content on the writing surface in the image stream;
  determining a first display size of a first receiving device of the at least one second electronic device;
  determining a first scaling factor of the spatial dimension that enables the written content to be legible when presented in the first display size by the first receiving device; and
  sizing the first portion of the image stream using the first scaling factor.

11. The method of claim 10, further comprising:
  in response to determining that the person is not attending to the writing surface, communicating to the video communication session via the at least one network interface, a second portion of the image stream that does not focus on the writing surface;
  wherein communicating the second portion comprises:
    identifying that the person is facing the image capturing device; and
    focusing on and capturing a face of the person as the second portion.

12. The method of claim 11, wherein a second display size of a second receiving device supports simultaneous output of the first portion and the second portion of the image stream, the method further comprising:
  combining the first portion and the second portion of the image stream into a substitute image stream; and
  selectively communicating the substitute image stream to the second receiving device of the at least one second electronic devices.

13. The method of claim 12, further comprising:
  recording a sequence of two or more portions of written content on the writing surface, each portion at least one of spatially separated or temporally separated from another portion; and
  communicating the recorded sequence of the two or more writings within a scrolling window presented to the at least one second electronic device.

14. The method of claim 10, wherein communicating the first portion of the image stream that focusses on the writing surface comprises:
  identifying at least one of (i) a hand of the person in proximity to the writing surface; (ii) the person is gazing toward the writing surface; and (iii) written content being added to the writing surface; and
  cropping of the captured image stream to encompass the first portion focused on the writing surface, which is communicated to the video communication session.

15. The method of claim 10, further comprising:
  determining a second scaling factor of the spatial dimension that enables the written content to be legible when presented in a second display size, which is larger than the first display size, by a second receiving device of the at least one second electronic device;
  sizing the first portion of the image stream using the second scaling factor; and
  communicating, to the second receiving device, the first portion sized using the second scaling factor.

16. The method of claim 10, further comprising:
  receiving, from at least one microphone of the electronic device, audio input comprising spoken words detected contemporaneously with a creation or presentation of associated written content on the writing surface;
  generating a closed-captioned version of the spoken words received by the at least one microphone; and
  communicating the closed-captioned version of the spoken words to the at least one second electronic device for outputting contemporaneously with the associated written content.

17. The method of claim 10, further comprising, in response to determining that the person is attending to the writing surface:
  determining at least one of a horizontal dimension and a vertical dimension of the writing; and
  cropping the image stream to the at least one of the horizontal dimension and the vertical dimension to provide the first portion.

18. The method of claim 10, wherein communicating the closed-caption version of the spoken words further comprises:
  linking each of at least two portions of written content with corresponding closed-captioned versions of spoken words captured by the at least one microphone contemporaneously with a generation of a respective portion of written content; and
  communicating both the close-captioned versions of the spoken words and the respective portion of written content for concurrent presentation with the closed-captioned version of spoken words aligned or interleaved with the its corresponding written content within the second display of the at least one second electronic device, to present a transcript.

19. A computer program product comprising:
  a computer readable storage device; and
  program code on the computer readable storage device that when executed by a processor associated with an electronic device, the program code enables the electronic device to provide functionality of:
    monitoring an image stream provided by at least one image capturing device of an electronic device;
    communicatively connecting the electronic device via a network using at least one network interface to at least one second electronic device during a video communication session;
    during the video communication session with at least one second electronic devices, identifying a person and a writing surface within the image stream;
    in response to determining that the person is attending to the writing surface, selectively communicating to the video communication session via the at least one network interface, a first portion of the image stream that focusses on the writing surface, the selectively communicating comprising:
      determining a spatial dimension of written content on the writing surface in the image stream;
      determining a first display size of a first receiving device of the at least one second electronic device;
      determining a first scaling factor of the spatial dimension that enables the written content to be legible when presented in the first display size by the first receiving device; and
      sizing the first portion of the image stream using the first scaling factor.

20. The computer program product of claim 19, wherein the program code enables the electronic device to provide the functionality of:
  in response to determining that the person is not attending to the writing surface, communicating to the video communication session via the at least one network interface, a second portion of the image stream that does not focus on the writing surface by:

identifying that the person is facing the image capturing device; and focusing on and capturing a face of the person as the second portion.

* * * * *